(12) United States Patent
Igarashi et al.

(10) Patent No.: US 7,021,051 B2
(45) Date of Patent: Apr. 4, 2006

(54) METHOD FOR REGENERATING PARTICULATE FILTER

(75) Inventors: Tatsuki Igarashi, Hino (JP); Kiyohiro Shimokawa, Hino (JP)

(73) Assignee: Hino Motors, Ltd., Tokyo (JP)

( * ) Notice: Subject to any disclaimer, the term of this patent is extended or adjusted under 35 U.S.C. 154(b) by 0 days.

(21) Appl. No.: 10/765,849

(22) Filed: Jan. 29, 2004

(65) Prior Publication Data
US 2004/0200213 A1   Oct. 14, 2004

(30) Foreign Application Priority Data
Apr. 8, 2003   (JP)   ............................. 2003-103848

(51) Int. Cl.
*F01N 3/00* (2006.01)
(52) U.S. Cl. ............................. 60/295; 60/274; 60/286; 60/297; 60/303; 60/311
(58) Field of Classification Search ................. 60/274, 60/285, 295, 297, 311, 286, 303
See application file for complete search history.

(56) References Cited

U.S. PATENT DOCUMENTS

| | | | |
|---|---|---|---|
| 4,719,751 A * | 1/1988 | Kume et al. | 60/285 |
| 5,503,804 A * | 4/1996 | Fujishita et al. | 422/109 |
| 6,412,276 B1 | 7/2002 | Salvat et al. | |
| 6,418,713 B1 * | 7/2002 | Gale et al. | 60/284 |
| 6,422,001 B1 * | 7/2002 | Sherman et al. | 60/274 |
| 6,594,990 B1 * | 7/2003 | Kuenstler et al. | 60/295 |
| 6,598,387 B1 * | 7/2003 | Carberry et al. | 60/297 |
| 6,622,480 B1 * | 9/2003 | Tashiro et al. | 60/295 |
| 6,758,037 B1 * | 7/2004 | Terada et al. | 60/295 |
| 6,865,883 B1 * | 3/2005 | Gomulka | 60/295 |

FOREIGN PATENT DOCUMENTS

| | | |
|---|---|---|
| DE | 199 26 138 A1 | 12/2000 |
| DE | 100 01 992 A1 | 7/2001 |
| EP | 1 074 702 A1 | 2/2001 |
| EP | 1 205 647 A1 | 5/2002 |

OTHER PUBLICATIONS

Patent Abstrracts of Japan, JP 11-101122, Apr. 13,1999.

* cited by examiner

*Primary Examiner*—Thomas Denion
*Assistant Examiner*—Diem Tran
(74) *Attorney, Agent, or Firm*—Oblon, Spivak, McClelland, Maier & Neustadt, P.C.

(57) ABSTRACT

Fuel is added to exhaust gas 9 upstream of a catalytic regeneration type particulate filter 13 in an exhaust pipe 11. The fuel added is oxidized on a flow-through type oxidization catalyst 14 before the particulate filter 13 to generate exothermic heat with which captured and accumulated particulates in the particulate filter 13 are burned off to forcibly regenerate the particulate filter 13. When the driving is being performed in light-load engine operation areas upon forcible regeneration of the particulate filter 13, a retarder 22 is activated, with an accelerator pedal retaining its on-state, and an amount of fuel injected is increased to compensate reduction of torque due to such activation of the retarder 22.

10 Claims, 3 Drawing Sheets

METHOD FOR REGENERATING PARTICULATE FILTER

BACKGROUND OF THE INVENTION

1. Field of the Invention

The present invention relates to a method for regenerating a particulate filter.

2. Description of the Related Art

Particulates or particulate matter in exhaust gas from a diesel engine is mainly constituted by carbonic soot and a soluble organic fraction of high-boiling hydrocarbons and contains a trace of sulfate or misty sulfuric acid fraction. In order to reduce a discharged amount of particulates from the engine, a particulate filter is conventionally employed and arranged in an exhaust pipe through which the exhaust gas flows.

The particulate filter of this kind is a porous honeycomb structure made of ceramics such as cordierite and having lattice-like compartmentalized passages; alternate ones of the passages have plugged inlets and the remaining passages with unplugged open inlets are plugged at their outlets. Thus, only the exhaust gas passing through the thin porous compartment walls is discharged downstream.

The particulates in the exhaust gas, which are captured and accumulated on the inner thin porous compartment walls of the particulate filter, require to be burned off so as to regenerate the particulate filter before exhaust resistance considerably increases due to clogging. However, the exhaust gas from the engine in a normal operation state rarely has a chance to reach a temperature level at which the particulates ignite by themselves. Then, a catalytic regeneration type particulate filter has been developed into practical use which integrally carries an oxidation catalyst made from alumina carrying platinum and added with a required amount of rare-earth element such as cerium.

Use of such catalytic regeneration type particulate filter facilitates oxidation of the captured and accumulated particulates and lowers their ignition temperature so that the particulates can be burned off even at an exhaust gas temperature lower than before.

However, even in use of such catalytic regeneration type particulate filter, a captured amount of particulates may exceed a burned-off amount of particulates in engine operation areas with low exhaust temperature level; and continued engine operation with such low exhaust temperature level may hinder good regeneration of the particulate filter, resulting in excessive accumulation of the captured particulates in the particulate filter. In order to overcome this, it has been envisaged that fuel is added to the exhaust gas upstream of the particulate filter through, for example, post fuel injection to forcibly regenerate the particulate filter before the particulates are substantially accumulated.

Specifically, the fuel added to the exhaust gas upstream of the particulate filter generates gaseous hydrocarbons which are oxidized on the oxidation catalyst carried by the filter to produce exothermic heat and raise the temperature of the carried catalyst to burn off the particulates, thus regenerating the particulate filter.

This kind of forcible regeneration of a particulate filter is disclosed, for example, in JP 2003-155915A and JP 2003-222040A.

Particularly in an exhaust purifier with a flow-through type oxidation catalyst upstream of a particulate filter to support oxidation of the captured particulates in the filter, gaseous hydrocarbons are oxidized on the flow-through type oxidation catalyst upstream of the particulate filter to generate exothermic heat and raise the temperature of the exhaust gas which is introduced into the particulate filter; as a result, the particulate filter can be forcibly regenerated at a further low exhaust temperature level.

However, in a case of a vehicle continuously operated in light-load engine operation areas with extremely low exhaust temperature level at which gaseous hydrocarbons cannot be oxidized on an oxidization catalyst, e.g., in a case of a city shuttle-bus which tends to travel on congested roads, rise in temperature of the carried catalyst of the particulate filter cannot be expected even in the combination of fuel addition with arrangement of a flow-through type oxidation catalyst upstream of the particulate filter. As a result, particulates may be extremely captured by and accumulated in the particulate filter, leading to increased exhaust pressure which adversely affects engine performance. The particulates accumulated in a large amount may be suddenly ignited, leading to fusion damage of the particulate filter.

The present invention was made in view of the above and has its object to provide a method for regenerating a particulate filter which positively prevents a catalytic regeneration type particulate filter from having excessively captured and accumulated particulates.

BRIEF SUMMARY OF THE INVENTION

The invention is directed to a method for forcibly regenerating a catalytic regeneration type particulate filter in an exhaust pipe through which exhaust gas flows, by adding fuel to the exhaust gas upstream of the particulate filter, the added fuel being oxidized on a flow-through type oxidation catalyst before the particulate filter to produce exothermic heat with which captured and accumulated particulates in the particulate filter are burned off, thereby forcibly regenerating the particulate filter, the method comprising, in light-load engine operation areas upon forcible regeneration of the particulate filter, intentionally increasing an engine load by load adding means and increasing an amount of fuel injected to compensate reduced torque due to the increased engine load.

Thus, when forcible regeneration of the particulate filter is required due to increase of the accumulated amount of particulates and even if the driving is being performed in light-load engine operation areas with extremely low exhaust temperature level at which fuel added cannot be oxidized on the flow-through type oxidization catalyst before the particulate filter, the engine load is intentionally increased by the load adding means and reduction of torque due to such increased engine load is compensated by increasing the amount of fuel injected so that the exhaust temperature can be raised without deteriorating the exhaust gas by the increase in engine load and the corresponding increase in amount of fuel injected. The compensation of the reduced torque due to the increased engine load also prevents drivability (driver's comfortability or satisfaction level on responsiveness and smoothness in driving) from being deteriorated.

With the exhaust temperature being thus elevated, fuel is added to the exhaust gas upstream of the particulate filter to produce high concentration of gaseous hydrocarbons which are oxidized without hindrance on the flow-through type oxidization catalyst before the particulate filter to generate exothermic heat. This exothermic heat substantially raises the temperature of the exhaust gas passing through the flow-through type oxidization catalyst; the exhaust gas thus elevated in temperature is introduced into the particulate filter to raise the temperature of the carried catalyst of the particulate filter, leading to good burn-off of the accumulated particulates in the particulate filter. Thus, forcible regeneration of the particulate filter is attained.

In a practical application of the invention, a retarder may be adopted as the load adding means and may be activated in light-load engine operation areas upon forcible regeneration of the particulate filter, with the accelerator pedal retaining its on-state. In this case, it is preferable to detect an entrance temperature of the flow-through type oxidation catalyst and to feedback-control a load on the retarder such that the entrance temperature is elevated up to a target value required for catalytic activity of the catalyst.

This makes it possible to properly apply the engine load for elevation in temperature of the exhaust gas such that the entrance temperature of the flow-through type oxidization catalyst is raised up to the target value required for catalytic activity of the catalyst. Thus, superfluously increasing the amount of fuel injected can be prevented to suppress fuel expenses to a minimum.

When a clutch is off-state upon the above-mentioned activation of the retarder in the light-load engine operation areas upon forcible regeneration of the particulate filter, with the accelerator pedal retaining its on-state, it is preferable to decrease an intake flow rate and increase the amount of fuel injected to compensate reduced torque due to the thus decreased intake flow rate.

Then, in a case where the engine load cannot be increased by the retarder which is off to the engine because of the clutch being off-state, the decreased intake flow rate decreases an amount of working air to the engine, leading to increased pumping loss and reduced torque. Increasing the amount of fuel injected to compensate such reduced torque raises the exhaust temperature. Moreover, an amount of exhaust gas generated through combustion in the engine decreases to lower heat capacity, which fact leads to further elevation of the exhaust temperature. Since the reduced torque due to the decreased intake flow rate is compensated, deterioration in drivability such as engine stall and/or vibration is also prevented.

DETAILED DESCRIPTION OF THE PREFERRED EMBODIMENT

An embodiment of the invention will be described with reference to the drawings.

Figure 1:
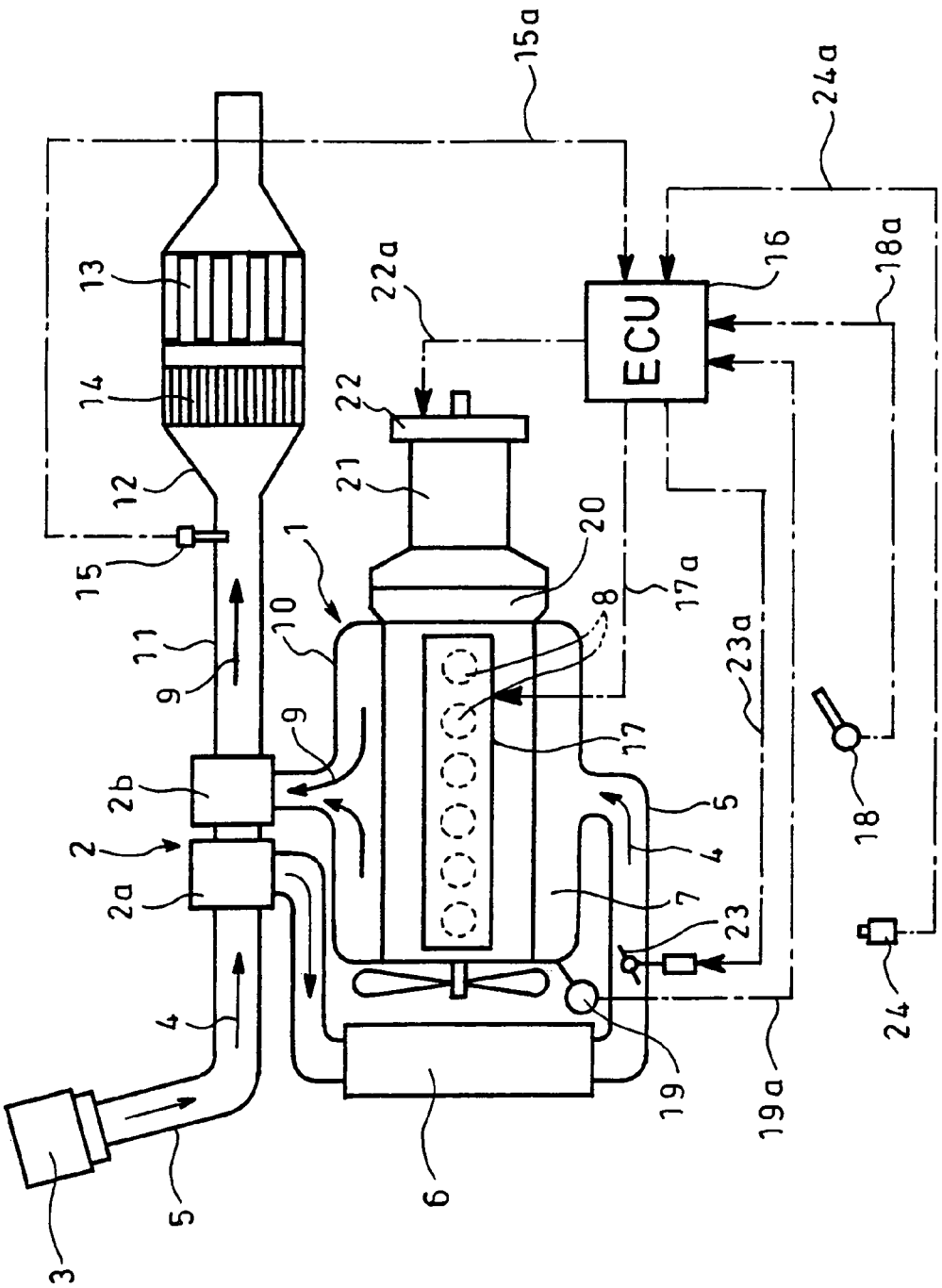
FIG. 1 is a schematic view showing an embodiment of the invention.

FIGS. 1 to 4 show an embodiment of the invention in which reference numeral 1 designates a diesel engine with a turbocharger 2 comprising a compressor 2a and a turbine 2b. Intake air 4 from an air cleaner 3 flows through an intake pipe 5 to the compressor 2a of the turbocharger 2 where it is pressurized. The air 4 thus pressurized is cooled by an intercooler 6 and fed to an intake manifold 7 where it is distributed to respective cylinders 8 of the diesel engine 1 (FIG. 1 shows a case of an in-line six cylinder engine).

Exhaust gas 9 from the cylinders 8 is supplied via an exhaust manifold 10 to the turbine 2b of the turbocharger 2. After driving the turbine 2b, the exhaust gas 9 is discharged outside via an exhaust pipe or passage 11.

Figure 2:
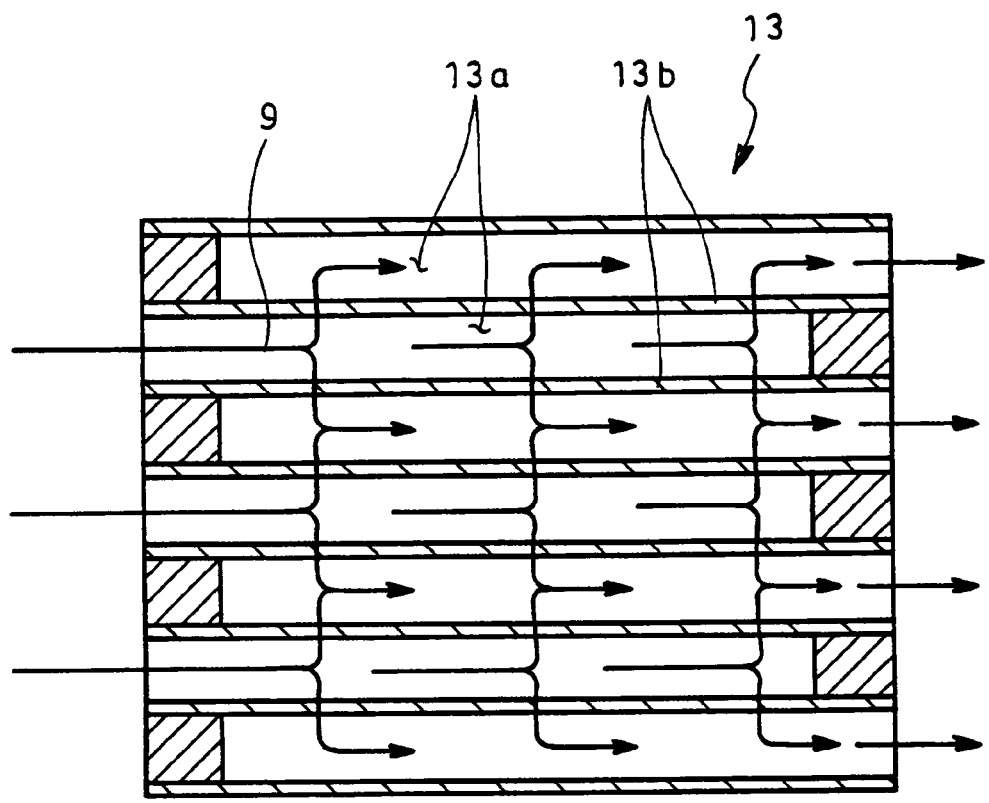
FIG. 2 is a sectional view showing details of a particulate filter shown in FIG. 1.

The exhaust pipe 11 has therein a filter case 12 which accommodates on its downstream side a catalytic regeneration type particulate filter 13 integrally carrying an oxidation catalyst. As shown in FIG. 2 in an enlarged manner, the particulate filter 13 is a porous honeycomb structure made of ceramics and having lattice-like compartmentalized passages 13a. Alternate ones of the passages 13a have plugged inlets and the remaining passages 13a with unplugged open inlets are plugged at their outlets. Thus, only the exhaust gas 9 passing through thin porous compartment walls 13b which define the passages 13a is discharged downstream.

Figure 3:
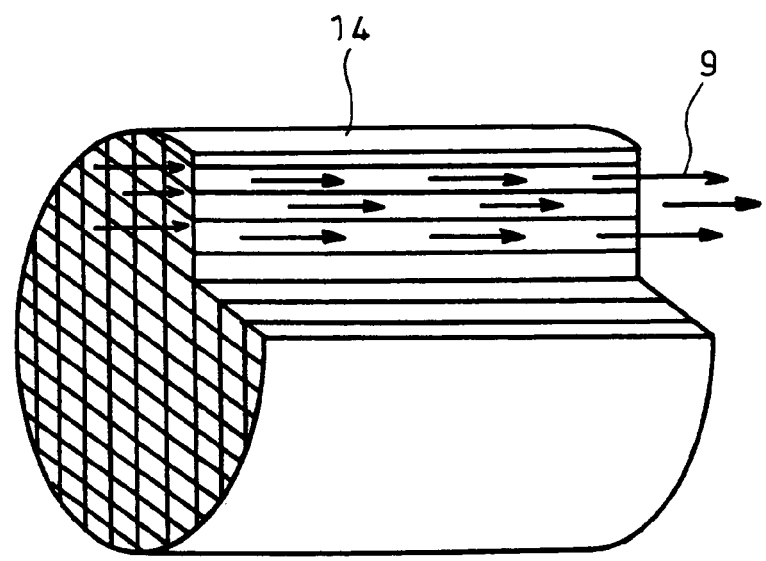
FIG. 3 is a partly cut-out perspective view showing details of an oxidation catalyst shown in FIG. 1.

The filter case 12 further accommodates just before the particulate filter 13 a flow-through type oxidation catalyst 14 having a honeycomb structure as shown in FIG. 3 in an enlarged manner. Located on an entrance side of the oxidation catalyst 14 is a temperature sensor 15 which measures the temperature of the exhaust gas 9. A detection signal 15a from the temperature sensor 15 is inputted to an electronic control unit (ECU) or engine control computer 16 from which a fuel injection signal 17a is outputted to a fuel injection unit 17, which injects fuel to the respective cylinders 8 of the engine 1 so as to give commands on injection timing and amount of the fuel to the injection unit 17.

The injection unit 17 comprises a plurality of injectors (not shown) each for each of the cylinders 8. Each of the injectors has a solenoid-controlled valve whose opening is controlled by the above-mentioned fuel injection signal 17a to control fuel injection timing (starting and termination of the injection) and an amount of fuel injected (valve-opening time period).

An accelerator pedal (not shown) located near a driver's seat is provided with an accelerator stepped-on degree or load sensor 18 which detects an accelerator stepped-on degree as a load to the diesel engine 1 which in turn has an engine speed sensor 19 to detect an engine speed. Accelerator stepped-on degree and engine speed signals 18a and 19a from the sensors 18 and 19, respectively, are also inputted to the ECU 16.

The ECU 16 is designed to be switched between normal and forcible regeneration modes. In the normal mode, the fuel injection signal 17a is decided depending upon the accelerator stepped-on degree and engine speed signals 18a and 19a. When the particulate filter 13 is to be forcibly regenerated, switching is made from the normal to the forcibly regeneration mode to decide the fuel injection signal 17a such that main fuel injection at or around a compressive top dead center (with crank angle of 0°) is followed by post fuel injection at non-ignition timing after the top dead center is passed past.

More specifically, the post fuel injection, which follows the main fuel injection at non-ignition timing after the top dead center, adds unburned fuel to the exhaust gas 9. This unburned fuel produces high concentration of gaseous hydrocarbons which are oxidized on the flow-through type oxidation catalyst 14 before the particulate filter 13. Thus, the exhaust gas 9 passing past the oxidation catalyst 14 is substantially raised in temperature by the exothermic heat. The exhaust gas 9 with the thus substantially elevated temperature is introduced into the particulate filter 13 to raise the temperature of the filter 13.

In the ECU 16, the speed of the diesel engine 1 is extracted from the engine speed signal 19a from the engine speed sensor 19; and the amount of fuel injected, which is evident as of decision of the fuel injection signal 17a, is extracted from the accelerator stepped-on degree signal 18a from the accelerator stepped-on degree sensor 18. A basic particulate generation amount in the current engine-operating state is estimated depending upon these extracted data on engine speed and amount of fuel injected, using a particulate generation amount map data. Then, the estimated basic particulate generation amount is multiplied by a correction factor applied in consideration of various parameters on generation of the particulates and then a burn-off amount of particulates in the current engine operation state is subtracted therefrom to obtain a final particulate generation amount. Such final particulate generation amount is momentarily submitted to a cumulative computation to estimate an accumulated particulate amount. When the accumulated particulate amount thus estimated reaches a predetermined target value, switching is made from the normal to the forcible regeneration mode.

There have been various proposals for estimating such accumulated particulate amount; other methods than is illustrated above may be, of course, employed for estimation of the accumulated particle amount. Further, instead of estimating the accumulated particle amount for use as a criterion on mode-switching, pressure loss of the particulate filter 13 may be detected for switching from the normal to the forcible regeneration mode.

In the embodiment, the diesel engine 1 has a rear portion connected through a clutch 20 to a transmission 21 with an auxiliary brake in the form of an eddy current retarder 22 (load adding means) to which an activation command signal 22a is outputted from the ECU 16 so as to generate a required braking power. To an intake throttle valve 23 in the intake pipe 5, an opening-degree command signal 23a is outputted form the ECU 16 so as to adjust an opening degree of the throttle valve 23.

The retarder 22 may be a conventional one used as an auxiliary brake for the transmission 21. The intake throttle valve 23 may be also a conventional one which may also serve as an intake shutter employed in combination with an idling stopper mechanism or as a noise suppresser employed in combination with the auxiliary brake. In the embodiment, such existing retarder and throttle valve 22 and 23 are utilized, as exhaust-temperature elevating means referred to hereinafter, by giving them operation commands independently of commands for their original operations.

In FIG. 1, reference numeral 24 denotes a switch on a clutch pedal (not shown) located near the driver's seat. A detection signal 24a from the switch 24 which senses on/off state of the clutch 20 is inputted to the ECU 16.

Figure 4:
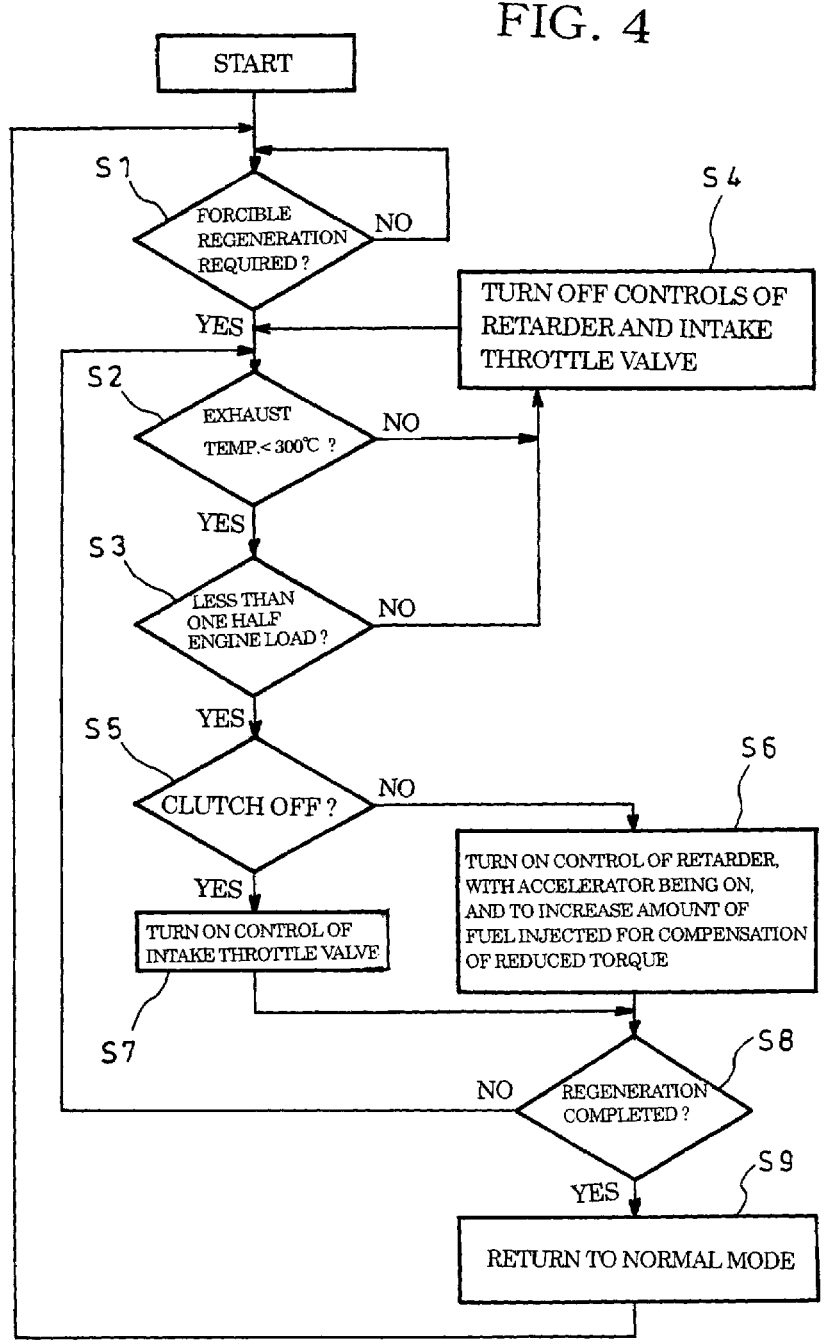
FIG. 4 is a flowchart showing specific control procedure for an electronic control unit (ECU) shown in FIG. 1.

A specific control procedure in the ECU 16 will be disclosed with reference to a flowchart shown in FIG. 4. In step S1, it is determined whether forcible regeneration of the particulate filter 13 is required or not on the basis of the accumulated particle amount estimated by the ECU 16. Only when it is determined that the forcible regeneration is required, flow proceeds to step S2; while "NO" is returned, the current flow is repeated.

In step S2, it is determined whether the exhaust temperature measured by the temperature sensor 15 at the entrance side of the oxidation catalyst 14 is less than 300° C. which is a minimum threshold for catalytic activity of the oxidation catalyst 14. Only when it is determined that the exhaust temperature is less than 300° C., flow proceeds to step S3; while "NO" is returned, the current flow is repeated via step S4.

Step S4 is to turn off controls of the retarder 22 and intake throttle valve 23 in light-load operating areas upon forcible regeneration operation of the particulate filter as will be described hereinafter. Unless such controls have been initiated, the current state with no such controls is merely maintained in step 4.

In step S3, it is determined whether the engine is in light-load operating areas where the engine load detected by the accelerator stepped-on degree sensor 18 is less than one half load or not. Only when it is determined that the engine is in light-load operating areas with the engine load being less than one half load, flow proceeds to step S5. When the engine load is equal to or more than one half load, flow returns via the above-mentioned step S4 to step S2 from which flow is repeated.

In step S5, it is determined on the basis of detection signal 24a from the switch 24 whether the clutch 20 is on or off. Only when it is determined that the clutch 24 is not off but on, flow proceeds to step S6 where control is performed such that the retarder 22 is activated with the accelerator pedal being on-state and the amount of fuel injected is increased to compensate reduced torque due to the activation of the retarder 22.

Upon activation of the retarder 22 with the accelerator pedal being on-state, a load on the retarder 22 is feedback-controlled so as to raise the temperature detected by the temperature sensor 15 up to a target value required for catalytic activity of the oxidation catalyst 14.

On the other hand, when it is determined in the above-mentioned step S5 that the clutch 20 is off, flow proceeds to step S7 where control is performed such that a flow rate of the intake is decreased by the intake throttle valve 23 and the amount of fuel injected is increased so as to compensate reduced torque due to the decreased intake flow rate.

After control either in steps S6 and S7, flow proceeds to step 8 where it is determined whether forcible regeneration of the particulate filter 13 has been completed or not. When it is determined that the forcible regeneration of the particulate filter 13 has been completed, the control proceeds to step S9 where the ECU 16 is switched to its normal mode and flow returns to step S1 from which flow is repeated in a new cycle. Conversely, when it is determined that the forcible regeneration has not been finished, flow returns to step S2 from which flow is repeated.

For determination in step S8 whether the forcible regeneration of the particulate filter 13 has been completed or not, for example, monitoring is performed on for what minutes the fuel addition has been continued under the condition that the measured value of the temperature sensor 15 exceeds a predetermined value. When such continuous time duration exceeds a predetermined time period enough for burning off of the accumulated particulate amount estimated in the particulate filter 13, it may be determined that the forcible regeneration has been completed.

Thus, with such operational control in the ECU 16 according to the embodiment, fuel injection control by the ECU 16 is switched from the normal to the forcible regeneration mode when the ECU 16 estimates that the accumulated particle amount has reached a predetermined target value. As a result, main fuel injection is followed by post fuel injection at a non-ignition timing after the compressive top dead center. This post fuel injection adds unburned fuel to the exhaust gas 9 so that the unburned fuel produces high concentration of gaseous hydrocarbons which are oxidized on the flow-through type oxidation catalyst 14 before the particulate filter 13. Thus, the exhaust gas 9 passing past the oxidation catalyst 14 is substantially raised in temperature by the exothermic heat. The exhaust gas 9 with the thus substantially elevated temperature is introduced into the particulate filter 13 so that the particulates in the particulate filter 13 is forcibly burned off at a lower exhaust gas temperature level.

Moreover, in such forcible regeneration mode, even when the driving is being performed in light-load engine operation areas with extremely low exhaust temperature level at which fuel added cannot be oxidized on the flow-though type oxidization catalyst 14 before the particulate filter, the retarder 22 is activated, with an accelerator pedal retaining its on-state, to thereby intentionally increase the engine load; reduction of torque due to such increased engine load is compensated by increasing the amount of fuel injected. As a result, the exhaust temperature can be raised without deteriorating the exhaust gas by the increase in engine load and the corresponding increase in amount of fuel injection. The compensation of the reduced torque due to the increased engine load also prevents drivability from being deteriorated.

With the exhaust temperature being thus elevated, fuel is added to the exhaust gas 9 upstream of the particulate filter 13 to produce high concentration of gaseous hydrocarbons which are oxidized without hindrance on the flow-through type oxidation catalyst 14 before the particulate filter 13 to generate exothermic heat. This exothermic heat substantially raises the temperature of the exhaust gas 9 passing through the flow-through type oxidation catalyst 14; the exhaust gas 9 thus elevated in temperature is introduced into the particulate filter 13 to raise the temperature of the carried catalyst of the particulate filter 13, leading to good burn-off of the accumulated particulates in the particulate filter 13. Thus, forcible regeneration of the particulate filter 13 is attained.

When a clutch is off-state upon the above-mentioned activation of the retarder 22 in the light-load engine operation areas upon forcible regeneration of the particulate filter, with the accelerator pedal retaining its on-state, an intake flow rate is decreased by the intake throttle valve 23 and the amount of fuel injected is increased so as to compensate reduced torque due to the decreased intake flow rate. Thus in a case where the engine load cannot be increased by the retarder 22 which is off to the diesel engine 1 because of the clutch being off-state, decrease of the intake flow rate decreases an amount of working air to the engine 1, leading to increased pumping loss and reduced torque. Increasing the amount of fuel injected to compensate such reduced torque raises the exhaust temperature. Moreover, an amount of exhaust gas 9 generated by combustion in the engine 1 decreases to lower heat capacity, which fact leads to further elevation of the exhaust temperature. Since the reduced torque due to the decreased intake flow rate is compensated, deterioration in drivability such as engine stall and/or vibration is also prevented.

Thus, according to the embodiment, even when the driving is being performed in light-load engine operation areas with extremely low exhaust temperature level at which fuel added cannot be oxidized on the flow-through type oxidization catalyst before the particulate filter, the retarder 22 is activated to intentionally increase the engine load; reduction of torque due to such increased engine load is compensated by increasing the amount of fuel injected. As a result, the exhaust temperature can be raised to a required temperature level without deteriorating the drivability and the exhaust gas 9. Thus, irrespective of the operation state of the diesel engine 1, the gaseous hydrocarbons produced from the fuel added are positively oxidized to generate exothermic heat whi]ỹ is utilized for good forcible generation of the particulate filter 13. As a result, the particulate filter 13 is positively prevented from having excessively captured and accumulated particulates. Thus, adverse affects on engine performance due to increased exhaust pressure and fusion damage of the particulate filter 13 due to sudden ignition of the particulates therein are prevented beforehand.

Furthermore, according to the embodiment, upon activation of the retarder 22 with the accelerator pedal retaining its on-state, in light-load engine operation areas for forcible regeneration of the particulate filter 13, the entrance temperature of the oxidization catalyst 14 is detected by the temperature sensor 15 and the load on the retarder 22 is feedback-controlled so as to raise the temperature detected by the temperature sensor 15 up to a target value required for catalytic activity of the oxidation catalyst 14. Thus, an appropriate engine load can be applied so as to raise the entrance temperature of the oxidation catalyst 14 up to a target value required for catalytic activity to thereby elevate the temperature of the exhaust gas 9. Superfluously increasing the amount of fuel injected can be prevented to suppress fuel expenses to a minimum.

In a case where the engine load cannot be increased by the retarder 22 which is off to the diesel engine 1 because of the clutch being off-state, the intake flow rate is decreased by the intake throttle valve 23 and the amount of fuel injected is increased to compensate reduction of torque due to such decreased intake flow rate. Thus, the exhaust temperature can be elevated while the deterioration of drivability such as engine stall and/or vibration is prevented. As a result, both the particulate filter 13 and the flow-through type oxidization catalyst 14 therebefore are substantially prevented from allowing to cool and kept in elevated temperatures.

It is to be understood that the method for regenerating a particulate filter according to the invention is not limited to the embodiment described above and that various changes and modifications may be effected without leaving the spirit and scope of the invention. For example, the post fuel injection followed by the main fuel injection and at non-ignition timing after the compressive top dead center is passed past in the above embodiment, as means for adding fuel to the exhaust gas upstream of the particulate filter, may be replaced by retarding in timing the main fuel injection into the respective cylinders of the engine to thereby adding fuel into the exhaust gas; alternatively, in place of such means for fuel addition in the form of unburned fuel being left in the exhaust gas through control of fuel injection into the cylinders, an injector may be arranged to be pierced into the exhaust pipe (possibly or the exhaust manifold) so as to directly inject fuel into the exhaust gas.

What is claimed is:

1. A method for forcibly regenerating a catalytic regeneration type particulate filter in an exhaust pipe through which exhaust gas flows, by adding fuel to the exhaust gas upstream of the particulate filter, the added fuel being oxidized on a flow-through type oxidation catalyst before the particulate filter to produce exothermic heat with which captured and accumulated particulates in the particulate filter are burned off, thereby forcibly regenerating the particulate filter, the method comprising, in light-load engine operation areas upon forcible regeneration of the particulate filter, intentionally increasing an engine load using a retarder to brake the engine and increasing an amount of fuel injected so as to compensate reduced torque due to the increased engine load, wherein, upon activation of the retarder, with an accelerator pedal retaining its on-state, in light-load engine operation areas for forcible regeneration of the particulate filter, and when a clutch is off, an intake flow rate is decreased and the amount of fuel injected is increased so as to compensate reduction of the torque due to such decreased intake flow rate.

2. The method as claimed in claim 1 wherein said retarder is activated, with the accelerator pedal retaining its on-state, in light-load engine operation areas upon forcible regeneration of the particulate filter.

3. The method as claimed in claim 2 wherein, upon activation of the retarder, with the accelerator pedal retaining its on-state, in light-load engine operation areas for forcible regeneration of the particulate filter, an entrance temperature of the flow-through type oxidization catalyst is detected and a load on the retarder is feedback-controlled so as to raise a temperature detected up to a target value required for catalytic activity.

4. A method of regenerating a filter of an engine, comprising:
   adding fuel to an exhaust gas produced by the engine when a predetermined operation state of the engine is determined;
   increasing a load on the engine using a retarder to brake the engine to decrease an amount of torque produced by the engine when the predetermined operation state is determined;
   routing the exhaust gas with the fuel to an oxidation catalyst;
   exothermically reacting the fuel in the exhaust gas with the oxidation catalyst to heat the exhaust gas; and
   routing the heated exhaust gas to the filter to regenerate the filter,
   further comprising decreasing an intake flow rate of air into the engine when the retarder is activated based on an operation state of an engine clutch,
   wherein decreasing comprises decreasing when the operation state of the engine clutch is off.

5. The method according to claim 4, further comprising:
   determining whether the engine is in a light-load engine operation state as the predetermined operation state.

6. The method according to claim 5, wherein the filter comprises a particulate filter having a porous honeycomb structure.

7. The method according to claim 6, wherein the filter comprises a ceramic material.

8. The method according to claim 5, further comprising:
   activating the retarder based on an operation state of an engine accelerator.

9. The method according to claim 8, wherein activating comprises activating when the operation state of the engine accelerator is on.

10. The method according to claim 9, further comprising:
    detecting a temperature of the exhaust upstream of the oxidation catalyst when the retarder is activated; and
    raising a temperature of the exhaust gas to a predetermined temperature based on the detected temperature.

* * * * *